July 13, 1948. H. M. REEVES 2,445,124
CABINET TYPE COOKING STOVE
Filed May 26, 1944

Inventor
Herbert M. Reeves
By
Carson, Pitzner, Hubbard, Wolfe.
Attorneys.

Patented July 13, 1948

2,445,124

UNITED STATES PATENT OFFICE 2,445,124

CABINET TYPE COOKING STOVE

Herbert M. Reeves, Kankakee, Ill., assignor to Florence Stove Company, Gardner, Mass., a corporation of Massachusetts Application May 26, 1944, Serial No. 537,379

6 Claims. (Cl. 126—37)

The invention relates to improvements in cooking stoves and particularly to cooking stoves of the cabinet type.

One object of the invention is to provide a cooking stove of novel and improved construction presenting all the conveniences of the so-called table type stoves, but having the broiling and baking ovens more conveniently located.

Another object is to provide a cooking stove having the broiling and baking ovens disposed above the cooking top, but in which the various parts are so arranged and interrelated that both the cooking top and the ovens are located in the positions most conveniently accessible to a woman of average height.

Another object is to provide a cooking stove having the broiling and baking ovens located above the cooking top and embodying a novel cover structure for closing the cooking top when not in use.

Still another object is to provide a novel cooking top cover structure for stoves of the above general character embodying two independently movable parts, one adapted to be accommodated below the ovens when the cover is open and to serve as a table top when the cover is closed and the other adapted to form an extension of the cooking top when the cover is open.

Other objects and advantages of the invention will become apparent from the following detailed description of the preferred embodiment illustrated in the accompanying drawing in which.

Figure 1:
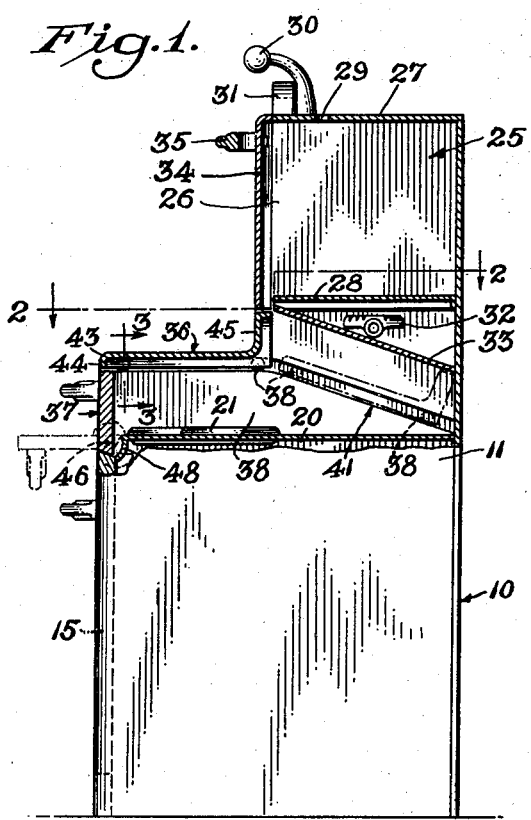
Figure 1 is a partly sectioned end view of a cooking stove embodying the features of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the preferred form herein shown by way of illustration, the stove comprises a generally rectangular body 10 having side and back walls formed by panels 11, 12 and 13. The front wall of the body is provided with suitable openings for the accommodation of a plurality of drawers 15 slidably received within the base.

Figure 2:
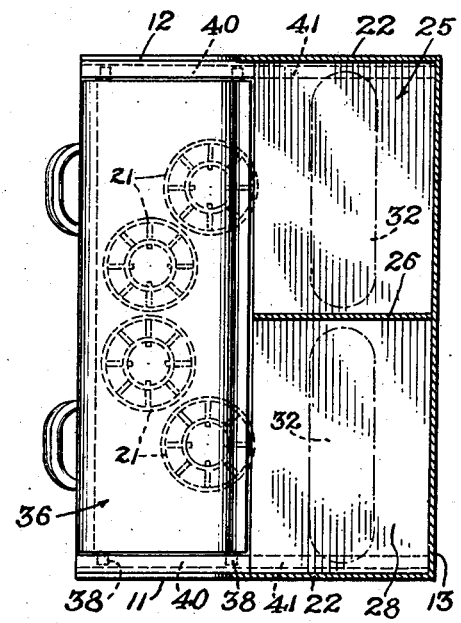
Fig. 2 is a sectional view taken in a plane substantially on the line 2—2 of Fig. 1.
Figure 3:
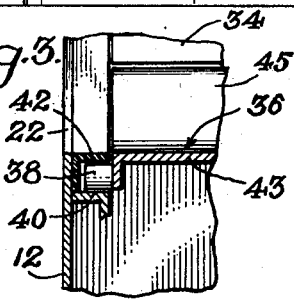
Fig. 3 is a fragmentary sectional view taken in a vertical plane substantially on the line 3—3 of Fig. 1.

Extending between the side panels 11 and 12, at a convenient height from the floor, is a horizontal plate 20 forming the cooking top of the stove. The cooking top is provided with openings for a plurality of heating elements or burners 21, herein shown as gas burners, there being four such burners in the exemplary stove all located forwardly of the center line of the top. As a matter of convenience, two of the burners 21 which may be of large size, are arranged in side by side relation adjacent the front edge of the cooking top and preferably centered with respect thereto. The other two burners 21, which may be of smaller size, are located slightly to the rear of the center burners adjacent the opposite side edges of the cooking top as shown in Fig. 2.

In carrying out the invention, each of the side panels 11 and 12 is formed with an extension 22 of approximately one half the width of the panel projecting a substantial distance above the cooking top 20 and coacting with the back panel 20 which is similarly extended to define an elongated oven compartment 25. This compartment may be divided by a vertical partition 26 to form a baking oven and a broiling oven. Top and bottom members 27 and 28 of sheet metal, suitably secured to the side and back panels, form the top and bottom walls of the oven compartment. The ovens may be vented through small openings 29 in the top member 27, such openings being concealed by a lamp 30 and a timer 31 mounted on the oven structure.

As the burners 21 are located forwardly of the center line of the cooking top, the bottom member 28 of the oven structure may be placed considerably closer to the cooking top than has been practicable in high oven or "console" type stoves as heretofore constructed. It has been found that a clearance of approximately eight and one-half inches between the cooking top and the bottom of the oven compartment is sufficient to permit full use of the burners. Thus, the cooking top may be located approximately thirty and one-half inches and the oven, thirty-nine inches from the floor which is most conveniently accessible to a woman of average height. Moreover, the lower overall height of the oven structure results in a more compact and better appearing stove.

Suitable burners 32 supported below the bottom member 28 serve to heat the baking and broiling ovens. Heat is reflected toward the ovens and the cooking top is shielded from the burners by a sheet metal plate 33 disposed below the side and back panels in any convenient manner. A door 34, preferably hinged at its lower edge and fitted with the usual pull 35 may be provided for each of the ovens.

The invention also provides a novel cover structure for closing the cooking top of the stove and forming an elongated shelf or ledge of substantial area adapted to serve as a table or working top when the burners 21 are not in use. Preferably, the cover is constructed and arranged so that it is spaced a substantial distance above the cooking top when closed. This permits the cover to be aligned with cabinets of standard height such as are commonly installed in kitchens and also allows the cover to be closed without disturbing ordinary pots and pans which may be standing on the burners 21. To this end, the cover is constructed in two parts, namely, a top member 36 movable horizontally from a position below the oven compartment 25 into a position to cover the burners 21 and spaced above the cooking top 20 so as to provide the desired clearance, and a front member 37 hinged at its lower edge and dimensioned to close the space between the member 36 and the cooking top 20.

To support and guide the cover member 36 for movement between open and closed positions, suitable guides are provided at opposite sides of the cooking top for coaction with laterally projecting pins or rollers 38 at opposite ends of the member. The guides, as herein shown, comprise members shaped to provide a horizontal track 40 extending from the front edge of the cooking top to a point directly below the forward edge of the oven compartment 25. The horizontal track 40 merges into a downwardly and rearwardly inclined track 41 extending below the oven compartment. The inclination of the track 41 enables the cover member to clear the burners 32 when pushed back below the oven structure. In the exemplary stove, the shield 33 is inclined at the same angle as the track 41. The cover member, when in open position, is thus accommodated in a space that is otherwise unused.

The tracks 40 and 41 may be supported in any suitable manner as for example, on the side panels 11 and 12, the forward sections of which are preferably extended above the plane of the cooking top to preserve the unitary character of the stove structure. The tracks 40, of course, are spaced from the cooking top to provide the desired clearance and to locate the cover member at the proper height from the floor. Angle bars 42 spot welded or otherwise secured to the side panels in spaced relation to the tracks 40 and 41 cooperate therewith to define a channel for the rollers 38 and thus serve to hold the rollers on the tracks and prevent accidental displacement of the cover member 36.

The cover member 36 is preferably of one piece construction and, as herein shown, comprises a flat generally rectangular body 43 formed with a depending flange 44 along its side and front edges. At its rear edge, the body member 43 is bent to form an upright wall portion 45 with the flange 44 extended along its side and top edges. The body portion 43 of the cover member is dimensioned to completely cover the section of the cooking top containing the burners 21 while the upright wall 45 closes the space between the body portion and the lower edges of the oven doors 34. Accordingly, when the cover and the oven doors are closed, the front of the stove presents a substantially unbroken surface of very attractive appearance.

The front cover member 37 is generally rectangular in form and is dimensioned to effectually close the space between the lower edge of the top cover flange 44 and the cooking top 20. To permit movement of the member between a vertical or closed position (Fig. 4) and a horizontal or open position (Fig. 5), the member 37 is supported at opposite ends on the stove base by pivot pins 46 to swing about a horizontal axis. The pivot pins are preferably so located that, in its closed position, the outer surface of the member 37, is substantially flush with the outer walls of the drawers 15 and with the front flange 44 of the cover member 36. A smooth unbroken surface is thus presented by the lower as well as the upper part of the stove. An upright member 47, suitably attached to the side panels of the stove, prevents the member from swinging beyond the vertical position.

Figure 5:
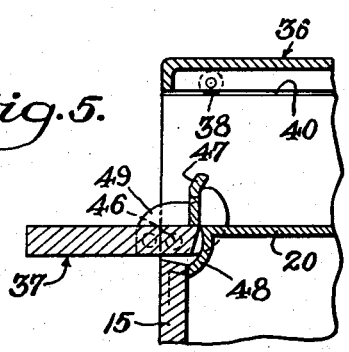

It is also desirable that the pivot pins 46 be located so that the inner surface of the member 37 is adapted to lie substantially flush with the surface of the cooking top 20 when the member is in the open position shown in Fig. 5. The member thus constitutes an extension of the cooking top and presents a working surface of convenient width extending the full width of the stove.

Figure 4:
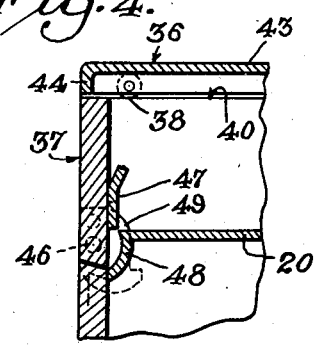
Figs. 4 and 5 are respectively fragmentary sectional views showing the front part of the cover structure in closed and open positions.

In order to maintain the foregoing relationship of the parts, the pivot pins 46 are set in from the lower edge of the member 37 as best shown in Figs. 4 and 5, and the said lower edge is beveled so as to interfit with the oppositely beveled edges of the drawers 15. To provide clearance for the overhanging edge portion of the cover member without leaving a substantial gap between the member and the cooking top, the latter is formed with the depending flange 48 arcuate about the pivotal axis of the member and spaced therefrom as shown in Fig. 5. The relatively tight fit thus provided prevents entry of dirt or other foreign material between the front cover member 37 and the cooking top 20.

To permit the use of the top member 37 as a working surface, stop means is provided for positively holding it in a horizontal position when opened. As herein shown, the stop means comprises a pair of links 49 secured to the ends of the cover member and adapted to rock therewith. The links may be provided at their inner ends with laterally projecting lugs adapted to hook over the stop members 47 and thus effectually prevent the cover member from swinging beyond the horizontal position shown in Fig. 5.

It will be apparent from the foregoing that the invention provides a cooking stove of advantageous construction. By reason of the novel form and relationship of the cooking top, the stove compartment and the cover structure, I am able to place the cooking top and the baking and broiling ovens in the most convenient location and to provide the substantial working surfaces heretofore available only in table top stoves. The location of the ovens above but relatively close to the cooking top locates them at the most convenient height, yet avoids the top heavy appearance characteristic of prior high oven stoves. Moreover, the compact appearance of the stove and its unitary construction is emphasized by forming the oven compartment from extensions of the side panels of the stove base.

The novel cover structure not only presents an appearance of unity and compactness, but also provides an effective means for closing the cooking top of the stove when not in use. Sufficient clearance is provided so that the cover may be closed without disturbing pots and pans standing on the burners. Moreover, the two part construction permits the use of one or the other of the parts of the cover structure as an auxiliary working top or extension of the cooking top when the cover is either open or closed. Thus the various elements of the stove, by reason of their novel form and relationship, all coact in producing a stove structure which is compact, efficient and very attractive in appearance.

I claim as my invention:

1. In a stove having a cooking top with a plurality of burners arranged in the forward portion thereof, an oven compartment located above said cooking top and rearwardly of said burners, an oven burner mounted below said compartment, a two part cover comprising independently movable front and top cover members, a track supporting said top cover member above said burners in a horizontal closed position spaced substantially midway between said cooking top and the bottom of said oven compartment, said top member having an upright wall portion effective when the member is in closed position to close the space between the member and the bottom of said oven compartment, means supporting said front cover member adjacent the front edge of said cooking top for pivotal movement from a horizontal position flush with the cooking top to a vertical position effective to close the space between the cooking top and said top cover member when the latter is in the closed position, and an extension of said track operative to guide said top cover member in a rearward movement from said closed position into an open position below said oven compartment, said extension being downwardly and rearwardly inclined to enable the upright wall portion of the member to clear the oven burner in such movement.

2. In a cooking stove, in combination, a cooking top having a plurality of burners, an oven compartment located above and rearwardly of said burners, an oven burner mounted below said compartment, a two-part cover for said cooking top, means supporting and guiding one part of said cover for movement from a horizontal position overlying said burners to a downwardly and rearwardly inclined position below said oven compartment, the inclination of said part being such as to enable it to clear said oven burner, a second part pivotally supported adjacent the front edge of said cooking top to swing between vertical and horizontal positions, said second part when in vertical position cooperating with said first part when in its horizontal position to completely enclose said cooking top, and a flange extending along the front edge of said cooking top, said flange being arcuate about the pivotal axis of said second cover part to provide clearance for the same.

3. In a cooking stove, in combination, a stove body having side and back panels, a cooking top supported by said body, said panels being extended upwardly from said cooking top, means cooperating with said panels to form an oven compartment disposed above and overlying the rear portion of said cooking top, a plurality of burners located in the forward portion of said cooking top, an oven burner disposed below said oven compartment, guide members supported on said side panels intermediate said cooking top and the bottom of said oven compartment, said guide members being horizontally disposed adjacent the forward portion of said cooking top and downwardly and rearwardly inclined below said oven compartment, and a cover member slidably supported on said guide members, said cover member having a main section adapted to cover said burners and an upright rear wall portion extending from said main section to the bottom of said oven compartment when the cover member is engaged with the horizontal portions of said guide members, the inclination of said guide members below said oven compartment permitting said upright portion of the cover member to clear said oven burner in the rearward movement of said cover member.

4. In a cooking stove, in combination, a stove body having side and back panels, a cooking top supported by said body, said panels being extended upwardly from said cooking top, means cooperating with said panels to form an oven compartment disposed above and overlying the rear portion of said cooking top, a plurality of burners located in the forward portion of said cooking top, a burner located below said oven compartment for heating the same, guide means extending along said side panels from the front to the rear of the stove above said cooking top, and a cover member slidable on said guide means from a closed position covering said burners to an open position below said oven compartment, said guide means being inclined downwardly and rearwardly below said oven compartment to enable said cover member to clear said oven burner in its movement to open position.

5. In a stove having a cooking top with a plurality of burners arranged in the forward portion thereof, an oven compartment located above said cooking top and rearwardly of said burners, an oven burner mounted below said compartment, a cover for said cooking top comprising front and top cover members, means supporting said top cover member above said burners in a horizontal plane spaced substantially above said cooking top and permitting movement of the member to a retracted position below said oven compartment along a rearwardly and downwardly inclined path, said front cover member being operative to close the space between the cooking top and said top cover member when the latter is in said horizontal position, and an upright wall portion adjacent the rear edge of the top cover member operative to close the space between the member and the bottom of said oven compartment when the member is in said horizontal position, the path of movement of said top cover member being such as to enable said upright wall portions of the top member to clear the oven burner in the movement of the member to the retracted position.

6. In a stove having a cooking top with a plurality of burner grids arranged in the forward portion thereof, an upper compartment located above said cooking top rearwardly thereof and having a front wall with its lower edge spaced vertically a substantial distance above the cooking top rearwardly of said burner grids, a top cover having a rear edge terminating adjacent the lower edge of said front wall of the upper compartment, means supporting said top cover for opening movement rearwardly beneath the oven compartment, said top cover when in closed position being spaced a sufficient distance above said cooking top to clear utensils standing on said burner grids, and a hinged front cover extending vertically between the top cover and the front edge of the cooking top to close the space at the front of the stove between said top cover and said cooking top, said cooking top being entirely exposed in upward and forward directions when said covers are in their open positions.

HERBERT M. REEVES.

REFERENCES CITED

The following references are of record in the file of this patent:

UNITED STATES PATENTS

| Number | Name | Date |
|---|---|---|
| Re. 21,079 | Cronyn et al. | May 16, 1939 |
| 668,036 | Cornell | Feb. 12, 1901 |
| 1,426,547 | Chilingirian | Aug. 22, 1922 |
| 1,492,582 | Smith | May 6, 1924 |
| 1,844,768 | Kirby | Feb. 9, 1932 |
| 1,891,118 | Stockstrom | Dec. 13, 1932 |
| 1,954,580 | Toomey | Apr. 10, 1934 |
| 1,963,281 | Rogers | June 19, 1934 |
| 2,290,781 | Teller et al. | July 21, 1942 |